United States Patent [19]

Moreland et al.

[11] Patent Number: 5,103,682
[45] Date of Patent: Apr. 14, 1992

[54] ULTRA-SENSITIVE FORCE DETECTOR EMPLOYING SERVO-STABILIZED TUNNELING JUNCTION

[75] Inventors: John M. Moreland, Louisville; William P. Dubé, Denver, both of Colo.

[73] Assignee: The United States of America as represented by The Secretary of Commerce, Washington, D.C.

[21] Appl. No.: 608,931

[22] Filed: Nov. 5, 1990

[51] Int. Cl.⁵ ............................................. G01L 1/08
[52] U.S. Cl. ................................. 73/862.61; 73/701; 505/842; 324/248
[58] Field of Search ............... 73/517 B, 701, 862.61; 177/212; 374/14, 52; 505/842; 250/306; 357/25, 26; 324/248

[56] References Cited

U.S. PATENT DOCUMENTS

| | | | |
|---|---|---|---|
| 4,343,993 | 9/1982 | Binnig et al. | 250/306 |
| 4,389,612 | 6/1983 | Simmonds et al. | 324/248 |
| 4,672,359 | 6/1987 | Silver | 340/347 |
| 4,724,318 | 2/1988 | Binnig | 250/306 |
| 4,866,373 | 9/1989 | Harada et al. | 324/127 |
| 4,912,408 | 3/1990 | Sawada et al. | 324/207.13 |
| 4,921,346 | 5/1990 | Tokumoto et al. | 250/306 X |
| 5,043,577 | 8/1991 | Pohl et al. | 250/306 |

OTHER PUBLICATIONS

Binnig et al., "Tunneling Through a Controllable Vacuum Gap", *Appl. Phys. Lett.*, 40, 178 (1982).
Moreland et al., "Electromagnetic Squeezer for Compressing Squeezable Electron Tunneling Junctions", *Rev. Sci. Inst.* 55(3), 1984.
Moreland et al., "Squeezable Electron Tunneling Junctions", *Applied Physics Letters*, 43(4), 1983.
Moreland et al., "Electron Tunneling Experiments Using Nb-Sn 'Break' Junctions", *Journal of Applied Physics*, 58(10), (1985).
Binnig et al., "Atomic Force Microscope", *Phys. Rev. Lett.*, 56, 9, 3 Mar. 1986, pp. 930-933.

*Primary Examiner*—Reinhard J. Eisenzopf
*Assistant Examiner*—Elizabeth Shopbell
*Attorney, Agent, or Firm*—Michael de Angeli

[57] ABSTRACT

A highly sensitive force detector using a tunneling junction as a strain gauge is disclosed. The tunneling junction is connected to a deflection member which receives the force to be measured. The junction is connected in a nulling circuit to a magnetic flux motor which generates a restoring force precisely equal to the force to be measured. The magnetic flux required by the flux motor to do so is measured by a SQUID, the output of which is directly proportional to the flux to be measured. The device has applications in pressure sensing, weighing, gravity measurements, detection of massive objects, and elsewhere.

13 Claims, 1 Drawing Sheet

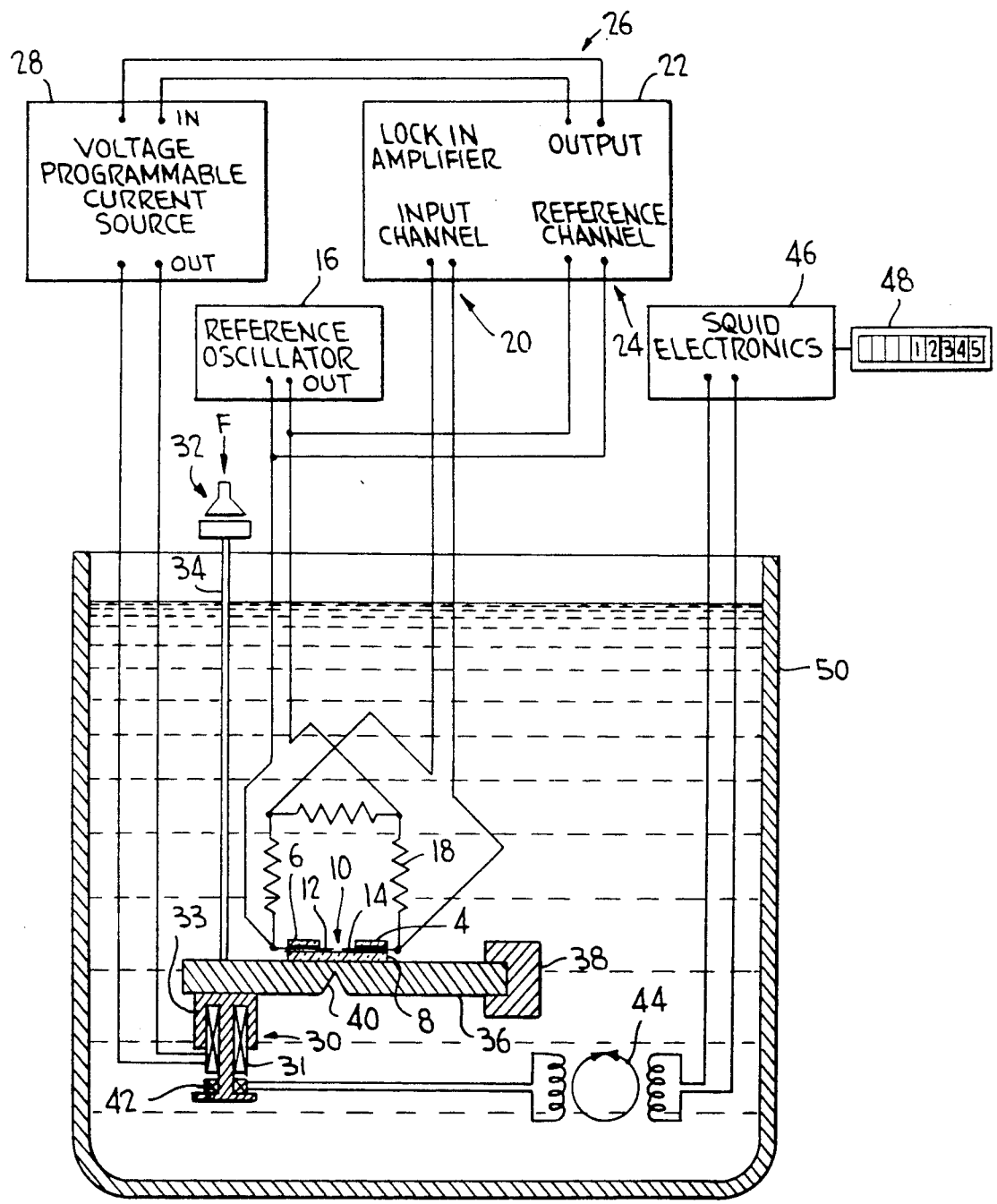

ULTRA-SENSITIVE FORCE DETECTOR EMPLOYING SERVO-STABILIZED TUNNELING JUNCTION

FIELD OF THE INVENTION

This invention relates to an improved force detector, which can be used in a wide variety of applications such as an ultra-sensitive weighing device, as a pressure sensor, as a gravity meter, for detection of massive objects, and the like.

BACKGROUND OF THE INVENTION

In recent years, much attention has been paid to devices employing tunneling junctions. A tunneling junction consists of two electrodes separated by a vacuum, gas or liquid gap on the order of 1 nm. Junctions consisting of gold spheres suspended on piezo-electric positioners have been used to demonstrate tunneling. Scanning tunneling microscopes with atomically sharp translating scanning tips spaced from an object being examined by piezo-electric positioners are relatively commonly used. The art also shows "squeezable" electron tunneling junctions and "break" junctions, both employing electromagnetic positioners. Thus, it is apparent that both electromagnetic and piezo-electric devices have been used to control the spacing of conductors in mechanically adjustable tunneling junctions.

As indicated, a tunneling junction in essence comprises two conductors separated by a very small gap on the order of 1 nm. If a small potential is provided across the electrodes, a "tunneling current" flows, even in the absence of physical contact, between the two portions of the junction. The tunneling junction resistance varies exponentially with the distance. Therefore, the junction resistance is a very sensitive indicator of variations in the electrode spacing. This known fact is employed by the present invention.

Most uses of mechanically adjustable tunneling junctions to date have related to scanning tunneling microscopy (STM). In this case, an atomically sharp tunneling electrode is traversed over a conductive substrate to be imaged. As noted, the junction resistance and thus tunneling current vary with electrode-to-substrate spacing. The current is monitored, and the relative height of the electrode from the nominal plane of the substrate is varied in a servo loop so as to maintain the current and thus the spacing constant. Variations in the servo signal are thus responsive to variations in the surface topography. Therefore, the servo signal can be used to image features of atomic size on the surface of the planar electrode. To date, STM devices have typically employed piezo-electric positioners for control of the electrode spacing. See Binnig et al, *Appl. Phys. Lett.*, 40, 178 (1982).

Squeezable electron tunneling junctions are disclosed by Moreland et al in "Electro-Magnetic Squeezer for Compressing Squeezable Electron Tunneling Junctions," *Review of Scientific Instruments*, 55(3), 1984 and in "Squeezable Electron Tunneling Junctions," *Applied Physics Letters*, 43(4), 1983. In these devices an electromagnet was used to control the gap spacing. An electromagnet was also used to control the gap spacing in so-called "break" junctions described also by Moreland et al in "Electron Tunneling Experiments using Nb-Sn 'break' junctions," *Journal of Applied Physics*, 58(10), (1985). In the latter work, a conductive filament was mounted on a flexible beam and broken to form very closely spaced surfaces of similar shape. The spacing of the junction, and thus the resistance of the tunneling junction, was controlled by varying the bending of the flexible beam. This work was performed using an Nb-Sn filament at cryogenic temperatures such that the filament itself was superconductive. However, nonsuperconductive filaments are substantially equally useful. An electromagnet was used to control the electrode spacing in a servo loop in which the current in the electromagnet was the control variable.

The present inventors are aware of no publication in which tunneling junctions controlled by an electromagnet have been used for force detection per se. Related devices referred to as atomic force microscopes (AFM's) have been used for force detection. In an AFM, a tunneling junction can be used to detect the motion of a flexible cantilever as it responds to an applied interatomic force. Variations in the tunneling current can be detected and used to image variations in the force on the cantilever as it is scanned over a sample's surface using a piezoelectric positioner. Alternatively, the force can be kept constant by disposing the cantilever in a feedback loop. Tunnel junction gap measurements of the cantilever deflection as above can be replaced by interferometric or capacitive detection schemes. However, it will be appreciated that the fact that the force is applied to the cantilever and its displacement measured by a second device unduly complicates such schemes for force detection.

SUMMARY OF THE INVENTION

According to the invention, an improved force detector is provided comprising a tunneling junction employed as a highly sensitive strain gauge sensitive to the motion of a deflection member to which the force to be measured is applied. The current across the tunneling junction is measured and used in a nulling servo loop to maintain the deflection member at a constant position. A magnetic flux motor such as a voice coil motor or the like is used to apply restoring force opposite the force to be measured, so that the nulling servo loop maintains the deflection member in a constant position. In this way any non-linearities in the mechanical system are essentially eliminated from the servo loop's control response; the restoring force is made exactly equal to the force to be measured. The force to be measured is determined by measuring the magnetic flux in the magnetic flux motor needed to apply the exact restoring force required. Preferably a SQUID (superconducting quantum interference device) is used as a very precise device for measuring the flux. The SQUID's output is proportional to the force to be measured.

BRIEF DESCRIPTION OF THE DRAWING

The single FIG. 1 is a schematic diagram of a system for force detection in an embodiment for weight detection according to the present invention.

DESCRIPTION OF THE PREFERRED EMBODIMENTS

As mentioned above, the present invention employs a tunneling junction disposed so that the junction spacing is varied responsive to the deflection of a deflection member upon exertion of a force to be measured thereon. In FIG. 1, the junction is defined at 10 by two closely-spaced electrodes 12 and 14. The conductors may be prepared generally according to the teachings of "Electron Tunneling Experiments Using Nb-Sn 'Break' Junctions," supra. The conductors 12 and 14 making up the junction 10 may in some cases be formed of material which is superconductive under operational conditions, but this is not necessary to achievement of the tunneling effect employed according to the invention. Essentially, one or more fine wires are bonded onto a sandwich between a microscope slide 8 and two microscope cover plates 4, 6. The microscope slide 8 is then flexed to break the wires in two, forming non-oxidized, closely spaced tunneling electrodes of very similar shape. These are then connected to a reference oscillator 16 which applies a signal across the junction 10 by way of one leg 18 of a Wheatstone bridge circuit. The other legs of the Wheatstone bridge circuit are connected to the input channel 20 of a lock-in amplifier 22. As is commonplace in the art, the Wheatstone bridge circuit is operated as a "nulling" or "balancing" circuit such that the resistance of the junction 10 is maintained constant. In a suitable embodiment, the reference signal from oscillator 16 is connected to the reference channel 24 of the lock-in amplifier 22. Suitable lock-in amplifiers comprise phase-sensitive detection circuits with a large dynamic reserve capable of recovering small signals from noise. Such instruments are commercially available.

In effect, the lock-in amplifier 22 detects any phase difference between the signals in the input channel and the reference channel due to variation of the resistance of the break junction 10. The lock-in amplifier 22 provides an output voltage at terminals 26 responsive to any phase difference. According to the invention, this output voltage is supplied to a voltage-programmable current source 28 which provides a current signal to a magnetic flux motor 30. In the simplest case, this can comprise a voice coil motor consisting of a voice coil 31 and an armature 33 as schematically illustrated. The magnetic flux motor 30 is arranged to generate a force in the illustration of FIG. 1 exerted upwardly, opposite to a force F to be measured.

In the illustration, the force F to be measured is depicted as a simple weight resting on an anvil mounted at the end of a quartz rod 34 or the like, transmitting force to a deflection member 36 which is cantilevered from a rigid mount 38 at one end. Obviously, it will be understood by those of skill in the art that this is a merely schematic arrangement for transmitting force to the deflection member and that numerous other uses of the invention could be made. Nor, of course, is the device of the invention limited to simple measurements of weight as illustrated; for example, the quartz rod 34 could be connected the diaphragm of a sensitive pressure cell or the like to measure changes in pressure. The device also could be used to measure changes in gravity, for detection of passage of massive objects, could be arranged as a magnetic detector, or to address many other uses.

As illustrated, the deflection member 36 may have a defined notch 40 or the like, to insure that the deflection takes place in a particular point; this is simply a matter of engineering choice and is well within the skill of the art.

By disposing the tunneling junction in a nulling servo loop controlling the magnetic flux motor 30, the actual force generated by the magnetic flux motor 30 is controlled to be equal to the force F to be measured. The force F to be measured is actually determined by measuring the magnetic flux using a second coil 42 connected to a commercially available SQUID flux detector 44 connected to similarly available SQUID electronics 46. Such SQUIDs are used in many applications where extremely accurate measurement of magnetic flux are required; see U.S. Pat. No. 4,912,408 to Sawada et al, for example, in which a SQUID is employed for displacement measurement. A display 48 connected to the SQUID electronics 46 is directly indicative of the magnetic flux of the motor 42, and is thus directly proportional to the force F to be measured.

Preferably, the SQUID 44, the magnetic flux motor 30, the deflection member 36, and the junction 10 are all disposed within a cryostat 50 containing liquid helium, liquid nitrogen, or other suitable cryogen for low noise performance, to insure superconductivity of the SQUID 44, and for stability of the junction 10 and the wheatstone bridge 18. As noted, in some circumstances it may be convenient or desirable to make the conductors 12 and 14 of the junction 10 of superconductive material, as well.

It will be appreciated by those of skill in the art that the device shown is an electro-mechanical feedback loop. When a force F is imparted to the deflection member 36, it changes shape, varing the spacing of the electrodes 12 and 14. As the tunnel junction's resistance changes due to mechanical deformation responsive to the external force F applied to the deflection member, the Wheatstone bridge circuit becomes unbalanced. The phase differential developed across the bridge between the input and reference channels is sensed by the lock-in amplifier 22, which adjusts the current supplied to the magnetic flux motor 30 until the external force F is cancelled. In this way the tunnel junction resistance remains constant during operation and any non-linearities in the mechanical system, the lock-in amplifier, the current source and the like are effectively cancelled. The SQUID 44 provides a highly sensitive measurement of changes in the flux of the motor 30 due to changes in the current flow which are directly proportional to the force F.

The fact that the change in tunneling current varies exponentially with displacement renders the entire apparatus extremely sensitive to small forces F, while the use of a SQUID to measure the magnetic flux allows the force to be measured with extreme precision.

Calculations performed by the inventors indicate that extremely sensitive measurements should be possible using this device. The ultimate limitation appears to be noise in the current source 28 used to drive the magnetic flux motor 30. One way to limit this noise may be to provide the coil 31 of the motor as two separate windings. The first winding would be a superconducting primary coil for the magnetic flux motor 30 capable of operating in a persistent mode, that is, as a permanent magnet. This would be disposed in the servo loop and energized prior to supply of the force F, that is, effectively so as to "zero" the apparatus, then isolated from the power supply 50 as to enter the persistent mode. A second winding having many fewer turns would actually be controlled by the voltage programmable current source 28. This would effectively limit the noise communicated to the deflection member by supply of coil drive current only in response to variations in the force F to be measured.

Numerous other modifications and improvements on the apparatus disclosed will be apparent to those of skill in the art, and the invention is, therefore, not to be limited by the above exemplary disclosure, but only by the following claims.

We claim:

1. Apparatus for measuring a force applied to a deflection member, comprising:
   a tunneling junction assembled to said deflection member such that deflection of the member responsive to a force to be measured causes a change in the junction geometry;
   means for applying a potential difference across the tunneling junction, such that a tunneling current flows thereacross;
   means for measuring the tunneling junction resistance;
   a magnetic flux motor for applying a restoring force to the deflection member in a direction opposite to the force to be measured;
   a nulling circuit for controlling and applying drive current to the magnetic flux motor responsive to the measured tunneling junction resistance, whereby said restoring force is controlled such that said tunneling junction resistance is maintained constant;
   a SQUID arranged to measure the magnetic flux generated by said magnetic flux motor in applying said restoring force to said deflection member; and
   means for determining the force to be measured responsive to the flux measured by the SQUID.

2. The apparatus of claim 1, wherein said tunneling junction comprises one or more pairs of spaced conductive members.

3. The apparatus of claim 2 wherein said tunneling junction is cooled in a cryostat also including said SQUID, said magnetic flux motor, and said deflection member.

4. The apparatus of claim 3, further comprising means extending out of said cryostat and adapted to transmit the force to be measured to the deflection member.

5. The apparatus of claim 3 wherein said tunneling junction comprises one or more pairs of spaced superconductive members.

6. The apparatus of claim 1 wherein said nulling circuit includes a Wheatstone bridge circuit, in which said tunneling junction forms one leg of the Wheatstone bridge circuit, and the restoring force applied by the magnetic flux motor is controlled responsive to imbalance of the Wheatstone bridge circuit.

7. The apparatus of claim 6 wherein an ac drive signal is supplied to the Wheatstone bridge circuit such that imbalance in the Wheatstone bridge circuit results in a phase difference between a reference signal connected across the tunneling junction and the drive signal, and said phase difference is detected by a phase-sensitive lock-in amplifier which supplies drive current to the magnetic flux motor responsive to detection of any such phase difference.

8. The apparatus of claim 3 wherein said cryostatically cooled magnetic flux motor comprises two windings, a first winding having a relatively greater number of turns of a superconducting material, capable of persistent mode operation, and a second winding having relatively fewer turns responsive to said nulling circuit for precise control of the force applied by the magnetic flux motor.

9. Method for measuring a force applied to a deflection member, comprising the steps of:
   assembling a tunneling junction comprising one or more pairs of spaced conductive members to the deflection member, such that deflection of the deflection member caused by application of the force to be measured thereto causes a proportional change in the geometry of the tunneling junction;
   applying a voltage across the tunneling junction, such that a tunneling current flows therethrough;
   measuring the tunneling current to determine the junction resistance;
   applying a controlled restoring current to a magnetic flux motor arranged to apply a restoring force to the deflection member opposite to the force to be measured;
   controlling the restoring current responsive to the measured tunneling current such that the tunneling current is maintained constant, whereby the restoring force is controlled to be equal and opposite to the force to be measured;
   employing a SQUID to measure the magnetic flux generated by the magnetic flux motor in providing the restoring force; and
   determining the force to be measured responsive to the measurement of the magnetic flux made by the SQUID.

10. The method of claim 9 comprising the further step of disposing the tunneling junction, the deflection member and the SQUID in a cryostat.

11. The method of claim 9 wherein the tunneling junction resistance is measured by a nulling circuit controlling the restoring current.

12. The method of claim 11 wherein said nulling circuit comprises a Wheatstone bridge circuit, one leg of the Wheatstone bridge circuit comprising the tunneling junction.

13. The method of claim 10 wherein the tunneling junction comprises one or more opposed pairs of spaced superconductive members.

* * * * *